UNITED STATES PATENT OFFICE.

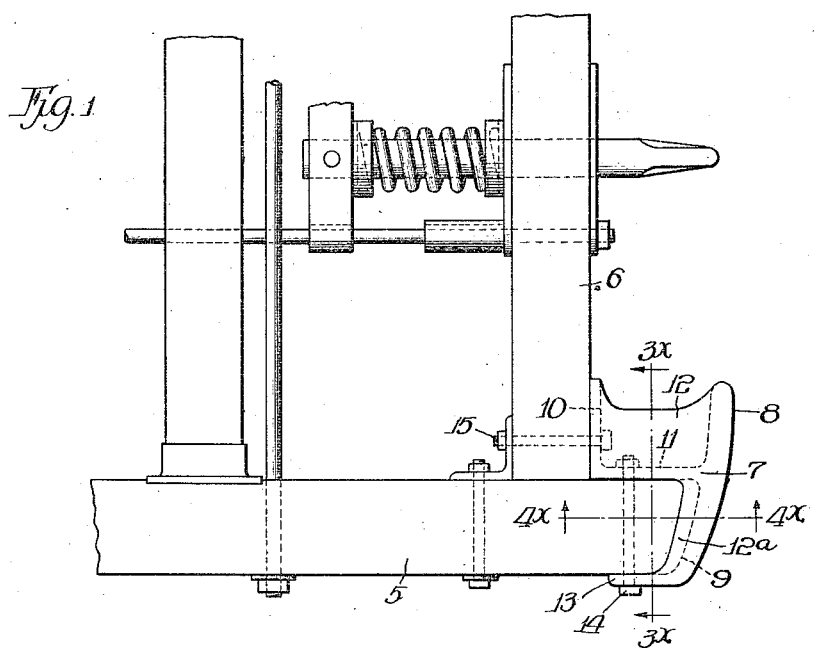
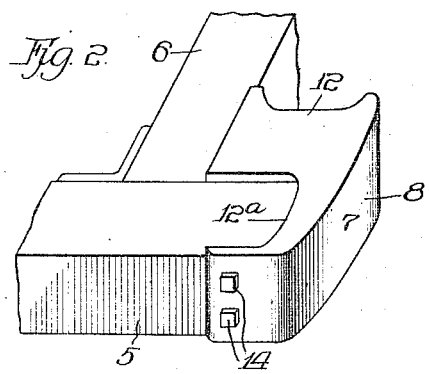
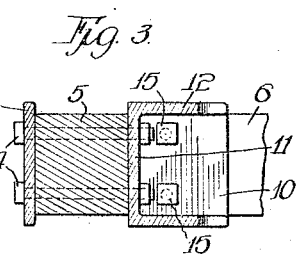
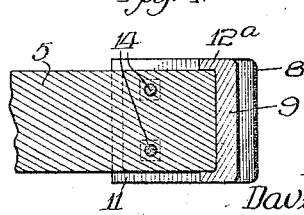

DAVID BOIES, OF SCRANTON, PENNSYLVANIA.

CAR-BUMPER.

1,284,226.

Specification of Letters Patent.

Patented Nov. 12, 1918.

Application filed April 29, 1918. Serial No. 231,421.

*To all whom it may concern:*

Be it known that I, DAVID BOIES, a citizen of the United States, residing at Scranton, in the county of Lackawanna and State of Pennsylvania, have invented certain new and useful Improvements in Car-Bumpers, of which the following is a specification.

This invention relates to bumpers to be provided upon the ends of cars in position to receive the impact and save the car structure from injury. The invention is designed more particularly for mine cars, ore cars, and other like rail vehicles of light construction intended to be connected *en train*, and in which the draft rigging is not customarily such as to be adapted to withstand the shock of impact incident to coupling the cars, careless handling, permitting cars to run together on grade, etc.

According to the present invention, the thrust is transmitted from one car to the next through the medium of longitudinal sills or frame members, preferably side sills, the ends of which are made to protrude beyond the transverse end members, suitable bumpers being provided upon these protruding ends to receive and transmit the impact without injury to the parts; and the invention consists broadly in such a combination of elements, and in a construction of bumper, *per se*, which is adapted to enter into such a combination: and specifically in the particular relation of the bumper to the longitudinal and transverse members through which it is adapted to distribute the impact between them, and to the particular construction of the bumper *per se* whereby it is better adapted to so distribute the load, and incidentally serve as a bracing element to connect the frame members named.

The invention will be fully understood upon reference to the accompanying drawing, in which—

Figure 1 is a detail view of one corner of a mine car frame having the preferred form of the bumper applied thereto;

Fig. 2 is a perspective view of the bumper detached; and

Figs. 3 and 4 are respectively a transverse section on the line $3^x$—$3^x$, and a longitudinal section on the line $4^x$—$4^x$, both indicated on Fig. 1.

5 represents a longitudinal member, in this instance a side frame, and 6 is a transverse member, to-wit, the end frame of a mine car construction, of which the side frame projects beyond the end frame and presents its end in position to receive the impact of abutting cars and transmit it longitudinally of the car. To prevent destruction of the protruding member 5, it is fitted with a bumper 7, and this bumper has a forward impact wall 8 that receives a like bumper on an adjacent car, and a seat 9 through which it imparts thrust to the longitudinal member 5. Impact wall 8 preferably recedes outwardly and rearwardly in an arc in order to present a suitable face when cars meet at different angles, and in order to sustain that portion of this wall which is preferably extended a distance transversely and inwardly from the member 5. the bumper is provided with a bearing plate 10 offset inwardly and rearwardly from the seat 9, and in position to receive the forward face of transverse member 6, and the impact wall and bearing plate are connected by longitudinal wall 11 and webs 12. Wall 11 preferably lies in position to receive the inner longitudinal face of member 5, and is paralleled by outer longitudinal wall 13 that adapts the bumper seat to embrace the end of member 5 laterally, while the extension of webs 12, as at $12^a$, adapts said seat to embrace said member above and below. The end of the member is thus prevented from splitting, and the bumper is firmly saddled thereon. Bolts 14 and 15 extending through the bumper walls and frame members firmly secure the structure, and adapt the bumper to serve as an effective angle brace in uniting the frame members.

I claim:

1. A car frame having longitudinal side members and transverse end members, and bumpers applied to and imposing the bumping thrust endwise upon the longitudinal side members, and protruding longitudinally beyond the transverse end members, said longitudinal side members being extended beyond the transverse end members and the inner portion of the bumper being offset rearwardly to bring it to a seating upon said end member.

2. A bumper for cars, having a seat adapted to receive the end of a longitudinal side member, a seat inwardly and rearwardly offset therefrom, adapted to receive the forward face of a transverse member, beyond which the side member extends, and having an impact face overlying both said seats.

3. A bumper for cars having a forward impact wall provided with a rearwardly presented seat adapted to receive the end of a longitudinal frame-member, a transverse plate offset inwardly and rearwardly from said seat, in position to receive the forward face of a transverse frame-member beyond which the longitudinal member extends, and a longitudinal plate connecting the transverse plate with the impact wall.

4. A bumper for cars having a forward impact wall provided with a rearwardly presented seat adapted to receive the end of a longitudinal frame-member, a transverse plate offset inwardly and rearwardly from said seat, in position to receive the forward face of a transverse frame-member, beyond which the longitudinal member extends, and a longitudinal plate connecting the transverse plate with the impact wall, said plates forming an angle brace through which to unite the longitudinal and transverse frame members.

5. A bumper for cars having a forward impact wall provided with a rearwardly presented seat adapted to receive the end of a longitudinal frame-member, a transverse plate offset inwardly and rearwardly from said seat, in position to receive the forward face of a transverse frame-member, beyond which the longitudinal member extends, and a longitudinal plate connecting the transverse plate with the impact wall, said impact wall also overlying both the end seat and transverse plate.

6. A bumper for cars having a forward impact wall provided with a rearwardly presented seat adapted to receive the end of a longitudinal frame-member, a transverse plate offset inwardly and rearwardly from said seat, in position to receive the forward face of a transverse frame-member, beyond which the longitudinal member extends, and a longitudinal plate connecting the transverse plate with the impact wall, said impact wall also overlying both the end seat and transverse plate; said bumper also having webs in planes perpendicular to its said plates, connecting its impact wall with said plates.

7. A bumper for cars having a forward impact wall provided with a rearwardly presented seat adapted to receive the end of a longitudinal frame-member, a transverse plate offset inwardly and rearwardly from said seat, in position to receive the forward face of a transverse frame-member, beyond which the longitudinal member extends, and a longitudinal plate connecting the transverse plate with the impact wall; and an outer longitudinal plate paralleling the inner longitudinal plate and serving therewith to embrace the end of a longitudinal member.

8. A bumper for cars having a forward impact wall provided with a rearwardly presented seat adapted to receive the end of a longitudinal frame-member and constructed to embrace above and below the same, a transverse plate offset inwardly and rearwardly from said seat, in position to receive the forward face of a transverse frame-member, beyond which the longitudinal member extends, and a longitudinal plate connecting the transverse plate with the impact wall.

9. A bumper for cars having a forward impact wall provided with a rearwardly presented seat adapted to receive the end of a longitudinal frame-member, a transverse plate offset inwardly and rearwardly from said seat, in position to receive the forward face of a transverse frame-member, beyond which the longitudinal member extends, a longitudinal plate connecting the transverse plate with the impact wall, and an outer longitudinal plate paralleling the inner longitudinal plate and serving therewith to embrace the end of a longitudinal member, said bumper also having horizontal webs connecting the impact wall with all of said plates.

Signed at Scranton, in the county of Lackawanna, State of Penn., this 23 day of April, A. D., 1918.

DAVID BOIES.

Witnesses:
J. J. BELL,
PAUL MEEKINS.